(12) United States Patent
Iseni et al.

(10) Patent No.: US 6,450,038 B1
(45) Date of Patent: Sep. 17, 2002

(54) HIGH-PRECISION PRESSURE SENSOR

(75) Inventors: Giosuè Iseni, Brembate;
Giovanbattista Preve, Brugherio;
Sergio Doneda, Pisogne, all of (IT);
Ernst Obermeier, Berlin (DE)

(73) Assignee: Gefran Sensori S.r.l., Provaglio d'Iseo (IT)

( * ) Notice: Subject to any disclaimer, the term of this patent is extended or adjusted under 35 U.S.C. 154(b) by 0 days.

(21) Appl. No.: 09/690,091

(22) Filed: Oct. 17, 2000

(30) Foreign Application Priority Data

Nov. 3, 1999 (IT) .......................... MI99A2294

(51) Int. Cl.7 ................................................ G01L 9/04
(52) U.S. Cl. .................................................. 73/720
(58) Field of Search ......................... 73/700, 715, 719, 73/720, 721, 726

(56) References Cited

U.S. PATENT DOCUMENTS 4,658,651 A * 4/1987 Le ............................ 73/708
5,511,428 A * 4/1996 Goldberg et al. ............. 73/777
5,661,245 A * 8/1997 Svoboda et al. .............. 73/726
5,691,479 A 11/1997 Werner et al.

FOREIGN PATENT DOCUMENTS

| DE | 37 03 685 | 8/1988 |
| EP | 0 251 592 | 1/1988 |
| GB | 2 211 659 | 7/1989 |

* cited by examiner

Primary Examiner—Max Noori
(74) Attorney, Agent, or Firm—Daniel O'Byrne

(57) ABSTRACT

A pressure sensor, particularly for use in extruders of plastic materials, having an outer enclosure containing a supporting element for a semiconductor chip which is provided with a strain-gauge on one of opposite faces of the chip, a covering element in order to close the enclosure, a mechanical transmission element accommodated in the covering element, directed toward the semiconductor chip and in contact with the chip, the semiconductor chip being accommodated so as to float in the supporting element.

8 Claims, 1 Drawing Sheet

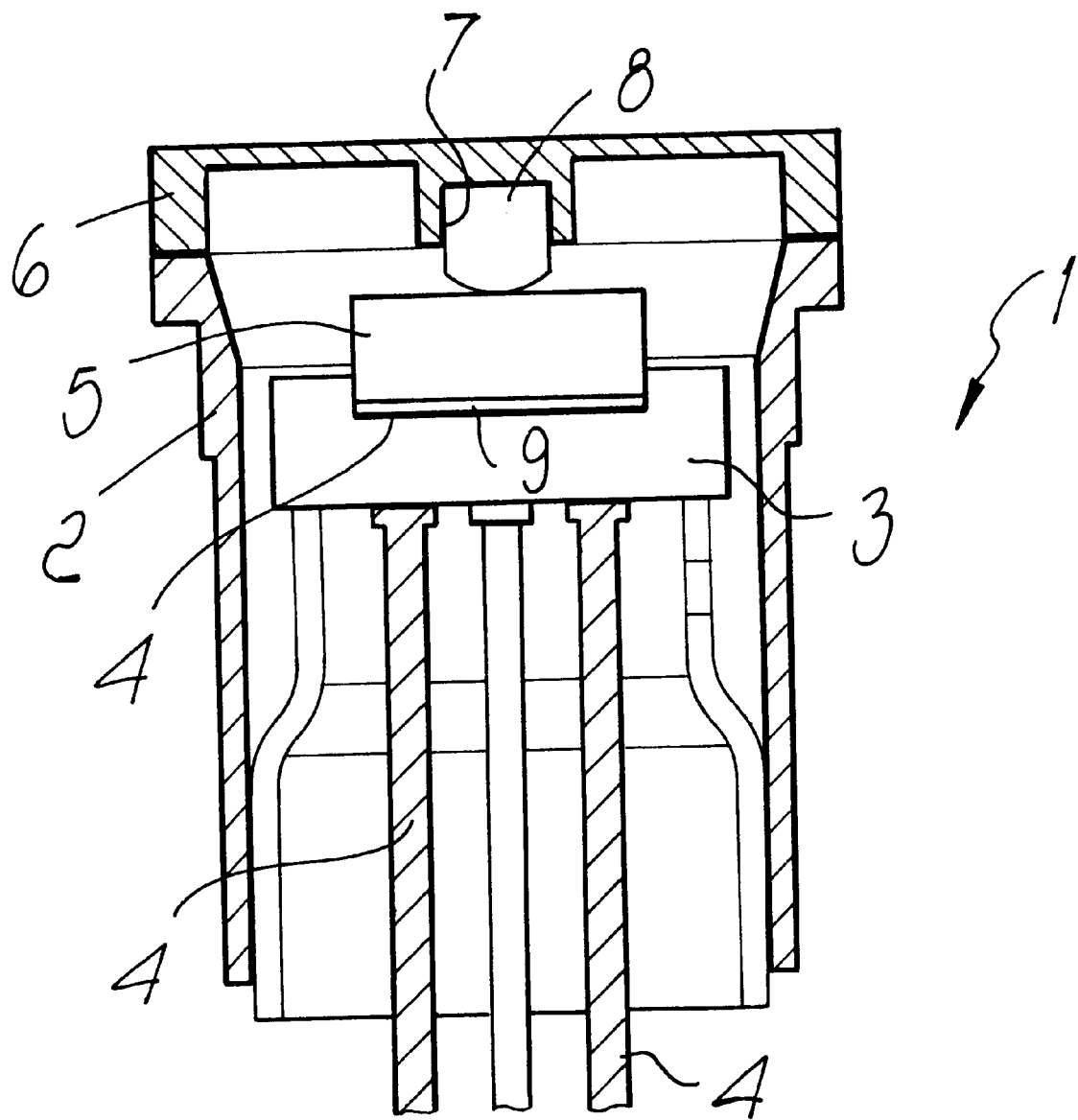

HIGH-PRECISION PRESSURE SENSOR

BACKGROUND OF THE INVENTION

The present invention relates to a high-precision pressure sensor. More particularly, the invention relates to a pressure sensor which is adapted to detect pressure in extruders of plastic materials, plastic films, synthetic fibers and the like.

It is known that pressure sensors used for example in the case of extruders of plastic materials, plastic films, synthetic fibers and the like comprise a rod-like element at a first end of which there is provided a membrane on the face of which a strain-gauge is arranged. The rod-like element is filled with a fluid, such as mercury or oil, and the compression of the fluid by the mass of plastic material whose pressure is to be measured applies an action to the strain gauge, which accordingly produces an electrical signal which is then interpreted by an electronic system connected to the pressure sensor.

The drawback of this pressure sensor is that it wears rapidly, since the melted plastic material easily damages the membrane, owing to its limited thickness. Accordingly, it is necessary to replace the pressure sensor; most of all, this entails the need to dispose of the mercury or oil, with considerable costs, since for example mercury is highly polluting and precise standards must be followed for its disposal.

Pressure sensors are further known which are constituted by a rod-like element, one end of which is provided with an element for the mechanical transmission of pressure which acts on a chip of semiconductor material on one face of which the strain-gauge is arranged. In practice, the semiconductor chip behaves like the membrane of the above-described sensor.

The presence of a semiconductor chip allows to solve the problem of the fluid, mercury or oil, which accordingly is no longer necessary.

The semiconductor chip is usually accommodated in an appropriately provided cavity formed in a block, made for example of alumina, from which metallized terminals extend which are suitable to carry the signal that originates from the strain-gauge to the electronic system for processing the signal.

These sensors have a semiconductor chip which is rigidly coupled to the alumina block for example by gluing.

The mechanical transmission element is normally accommodated in a cover which is meant to be coupled to an external metallic enclosure which internally accommodates the alumina block with the corresponding semiconductor chip rigidly coupled thereto.

The advantage of this solution is that the membrane, which in this case is constituted by the chip of semiconductor material, is practically not subject to wear due to friction with the plastic material whose pressure is to be measured.

However, the fact that the semiconductor chip is rigidly coupled to the alumina block that supports it entails that the signals generated as a consequence of pressure sensing may be inaccurate, because of the deformation that may affect the alumina block that accommodates and supports the semiconductor chip.

Therefore, even the above solution is not free from drawbacks, and in particular measurement precision, which is a fundamental requirement, is not ensured absolutely.

SUMMARY OF THE INVENTION

The aim of the present invention is to provide a pressure sensor, particularly for an extruder of plastic materials and the like, which has a high measurement precision which is constant over time.

Within the scope of this aim, an object of the present invention is to provide a pressure sensor which is highly resistant.

Another object of the present invention is to provide a pressure sensor, particularly for extruders of plastic materials and the like, in which the alteration of the measurement signal caused by thermal expansions, deformations and the like is reduced to the lowest possible level.

Another object of the present invention is to provide a pressure sensor, particularly for extruders of plastic materials, which is highly reliable, relatively easy to manufacture and at competitive costs.

This aim, these and other objects which will become apparent hereinafter are achieved by a pressure sensor, particularly for use in extruders of plastic materials and the like, which comprises an outer enclosure which is adapted to contain a supporting element for a semiconductor chip which is provided with a strain-gauge on one of opposite faces of said chip, a covering element being provided in order to close said enclosure, a mechanical transmission element being accommodated in said covering element, being directed toward said semiconductor chip and being in contact with said chip, characterized in that said semiconductor chip is accommodated so as to float in said supporting element.

BRIEF DESCRIPTION OF THE DRAWING

Further characteristics and advantages of the present invention will become better apparent from the following detailed description of a preferred but not exclusive embodiment of the pressure sensor according to the invention, illustrated only by way of non-limitative example in the accompanying drawings, wherein the only FIGURE is a transverse sectional view of the end portion of a pressure sensor executed according to the present invention.

DESCRIPTION OF THE PREFERRED EMBODIMENTS

With reference to the above FIGURE, the sensor according to the invention, whose end portion according to the present invention is generally designated by the reference numeral 1, comprises an outer enclosure 2 which is suitable to accommodate a supporting element 3 which has a seat 4 for accommodating a semiconductor chip, as described hereinafter.

The supporting element 3 is preferably provided by means of an alumina block from which metallized conductors 4 extend which are meant to carry the signal generated by the semiconductor chip to the electronic system connected to the sensor according to the invention.

The reference numeral 5 designates a semiconductor chip which is meant to be accommodated in the seat 4 formed in the supporting element 3.

A covering element 6 is provided above the outer enclosure 2 in order to close, like a cover, the outer enclosure 2. The covering element 6 is provided with a seat 7 which accommodates a mechanical transmission element 8 which is meant to apply pressure to the semiconductor chip 5 when a flow of plastic material strikes the upper surface of the covering element 6. A strain-gauge 9 is applied to the face of the semiconductor chip which is opposite to the face whereon the mechanical transmission element acts.

The particularity of the present invention is that the semiconductor chip 5 is accommodated so as to float in the seat 4 of the supporting element 3, i.e., it is not rigidly coupled to the supporting element 3 as occurs in conventional pressure sensors.

This renders the semiconductor chip 5 independent of any expansions and deformations which the supporting element 3 may undergo and therefore to obtain a pressure measurement signal which is absolutely precise and most of all constant over time. Conveniently, the covering element 6 has a thickness which avoids damage thereto.

Moreover, in the pressure sensor according to the invention the semiconductor chip is preferably made of silicon carbide or of so-called SOI (Silicon On Insulator) or for example of SOS (Silicon On Sapphire).

Conveniently, the mechanical transmission element 8 also can be accommodated so as to float inside the covering element 6, in order to further minimize the alterations that the pressure signal detected by the pressure sensor can undergo.

The mechanical transmission element 8 is further accommodated in the seat 7 of the covering element 6 so as to be pre-loaded and therefore always make contact with the semiconductor chip 5, so as to always be in contact with the semiconductor chip 5.

In practice it has been observed that the sensor according to the present invention fully achieves the intended aim, since it allows to achieve a much more accurate pressure measurement than obtainable with conventional devices. Moreover, the high thickness of the covering element renders the pressure sensor substantially immune to damage due to the action of plastic material thereon, which if a conventional thin membrane is used causes damage to the membrane due to friction. The device can also be employed in chemical processes and the like.

The device thus conceived is susceptible of numerous modifications and variations, all of which are within the scope of the inventive concept; all the details may also be replaced with other technically equivalent elements.

In practice, the materials used, so long as they are compatible with the is specific use, as well as the dimensions, may be any according to requirements and to the state of the art.

The disclosures in Italian Patent Application No. MI99A002294 from which this application claims priority are incorporated herein by reference.

What is claimed is:

1. A pressure sensor, for use in extruders of plastic materials, and chemical process, comprising:

an outer enclosure;

a supporting element contained said outer enclosure;

a semiconductor chip supported in said supporting element;

a strain-gauge arranged on a first ace of opposite faces of said chip;

a covering element closing said enclosure and arranged for receiving a flow of plastic material;

a mechanical transmission element accommodated in said covering element, said mechanical transmission element being directed toward said semiconductor chip and being in contact with a second face of said opposite faces of said chip, said mechanical transmission element being disposed between said covering element and said semiconductor chip for transmitting pressure from the flow of plastic material from said covering element through said mechanical transmission element to said chip and to said strain-gauge arranged on said chip;

said semiconductor chip being accommodated in a seat of said supporting element so as to float in said seat of said supporting element, and said strain-gauge being accommodated in said seat of said supporting element so as to float in said seat of said supporting element.

2. The pressure sensor according claim 1, wherein said mechanical transmission element accommodated in said covering element is accommodated so as to float in a seat formed in said covering element.

3. The pressure sensor according to claim 1, wherein said supporting element is made of alumina, the pressure sensor further comprising conductors extending from said supporting element for transferring a pressure signal detected by said strain-gauge arranged on said first face of said semiconductor chip that lies opposite said second face of said semiconductor chip on which said mechanical transmission element acts.

4. The pressure sensor according to claim 3, wherein said mechanical transmission element is accommodated in said covering element so as to be pre-loaded against the second face of said semiconductor chip on which said mechanical transmission element acts.

5. The device according to claim 1, wherein said semiconductor chip is made of silicon carbide.

6. The device according to claim 1, wherein said semiconductor chip is made of SOI.

7. The device according to claim 1, wherein said semiconductor chip is made of SOS.

8. The device according to claim 1, wherein said mechanical transmission element is arranged to act and make contact exclusively on a limited central region of said second faced of said chip.

* * * * *